(12) United States Patent  (10) Patent No.: US 9,377,175 B2
Kuo  (45) Date of Patent: Jun. 28, 2016

(54) LED STREET LIGHT

(71) Applicant: HON HAI PRECISION INDUSTRY CO., LTD., New Taipei (TW)

(72) Inventor: Shien-Cheng Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 84 days.

(21) Appl. No.: 14/508,860

(22) Filed: Oct. 7, 2014

(65) Prior Publication Data

US 2015/0138766 A1 May 21, 2015

(30) Foreign Application Priority Data

Nov. 19, 2013 (CN) .......................... 2013 1 0577198

(51) Int. Cl.
F21V 15/01 (2006.01)
F21V 5/00 (2015.01)
F21K 99/00 (2016.01)
F21V 17/10 (2006.01)
F21V 29/00 (2015.01)
F21V 7/00 (2006.01)
F21V 13/04 (2006.01)
F21V 29/80 (2015.01)
F21Y 101/02 (2006.01)
F21W 131/103 (2006.01)

(52) U.S. Cl.
CPC . *F21V 5/007* (2013.01); *F21K 9/50* (2013.01); *F21V 7/0083* (2013.01); *F21V 13/04* (2013.01); *F21V 17/101* (2013.01); *F21V 29/004* (2013.01); *F21V 29/24* (2013.01); *F21V 29/80* (2015.01); *F21W 2131/103* (2013.01); *F21Y 2101/02* (2013.01); *Y02B 20/72* (2013.01)

(58) Field of Classification Search
CPC .... F21W 2131/103; Y02B 20/72; F21K 9/50; F21V 5/007; F21V 7/0083; F21V 13/04
See application file for complete search history.

(56) References Cited

U.S. PATENT DOCUMENTS

| | | | | |
|---|---|---|---|---|
| 5,580,156 A | * | 12/1996 | Suzuki | B60Q 7/00 116/63 P |
| 6,318,886 B1 | * | 11/2001 | Stopa | F21K 9/00 257/E25.028 |
| 7,312,927 B2 | * | 12/2007 | Bogner | G02F 1/133603 257/E25.02 |
| 2008/0219000 A1 | * | 9/2008 | Fan | F21S 8/086 362/241 |
| 2009/0257224 A1 | * | 10/2009 | Huang | F21V 19/001 362/235 |
| 2010/0110636 A1 | * | 5/2010 | Chou | F21V 29/004 361/702 |
| 2011/0210676 A1 | * | 9/2011 | Beghelli | F21V 11/02 315/185 R |
| 2012/0092879 A1 | * | 4/2012 | Chang | F21V 17/164 362/374 |
| 2015/0138769 A1 | * | 5/2015 | Chen | F21K 9/00 362/240 |

* cited by examiner

*Primary Examiner* — Julie Bannan
(74) *Attorney, Agent, or Firm* — ScienBiziP, P.C.

(57) ABSTRACT

An LED street light includes a bottom cover, a top cover connected with the bottom cover, a lamp board, and a plurality of lenses mounted on the top cover. The lamp board comprises a plurality of LEDs. A substantial portion of the top cover and bottom cover is composed of thermally conductive material. The bottom cover comprises a plurality of outwardly extending extensions aiding in heat dissipation. The top cover includes a plurality of recesses receiving the LEDs, and each recess includes a plurality of side walls and a bottom surface providing a large heat-dissipating area. One or more of the recesses includes at least one opening between two adjacent side walls.

15 Claims, 5 Drawing Sheets

LED STREET LIGHT

FIELD

The present disclosure relates to light emitting diodes (LEDs), and in particular to an LED street light.

BACKGROUND

LEDs are an important lighting resource. Recently, LEDs as a light source have been employed in outdoor lighting devices, (for example, street lights). Heat dissipation is an issue to be addressed in the manufacturing of a LED street light. A heat dissipating structure can be disposed below the LED module in an LED street light to avoid a reduction in length of service life of the LED module by overheating.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
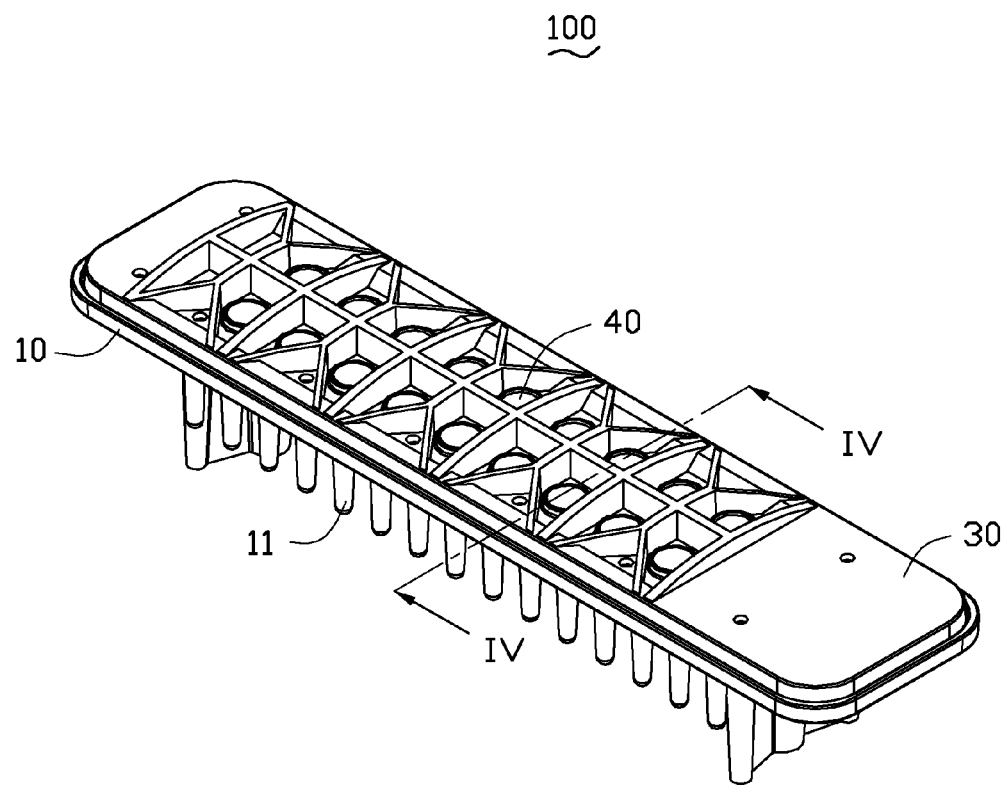
FIG. 1 is an isometric view of an LED street light according an embodiment of this disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape, or other feature that is modified by the word "substantially", such that the feature of the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 illustrates an LED street light 100, which can include a bottom cover 10, a top cover 30, and a plurality of lenses 40. The bottom cover 10 can be coupled with the top cover 30 to cooperatively form a receiving space 50 (see FIG. 2). The lenses 40 can be mounted on the top cover 30.

Figure 2:
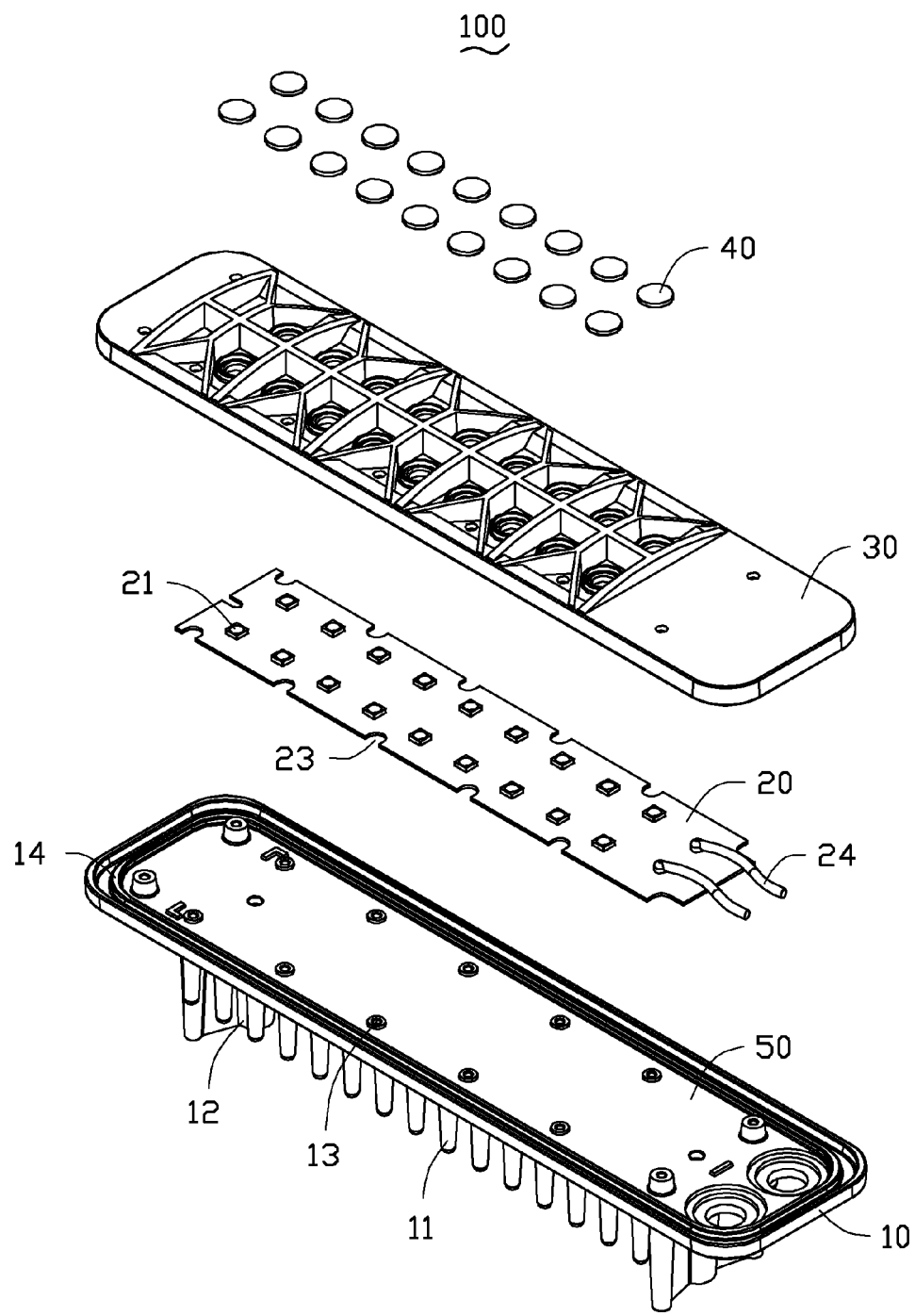
FIG. 2 is an exploded view of the LED street light of FIG. 1.

FIG. 2 illustrates that the LED street light 100 can further include a lamp board 20. The lamp board 20 can be positioned in the receiving space 50 between the top cover 30 and the bottom cover 10. The lamp board 20 can include a plurality of LEDs 21 positioned in an array on a surface toward the top cover 30. In at least one embodiment, the LEDs 21 can be arranged in two parallel lines. In other embodiments, the LEDs 21 can be arranged in other patterns. The lamp board 20 can define a plurality of cutouts 23 on the periphery thereof.

The bottom cover 10 can include a plurality of heat dissipation columns 11 extending out of the surface of the lamp board 20 opposite to the top cover 30. The surface of the bottom cover 10 toward the top cover 30 can define a plurality of blind holes 13 and a ridge 14 along the edge of the bottom cover 10. The cutouts 23 of the lamp board 20 can be positioned to correspond to, and mate with, blind holes 13. The lamp board 20 can further include a power interface 24 which is configured to connect to an external power source. The ridge 14 can be annular around the bottom cover 10.

Figure 3:
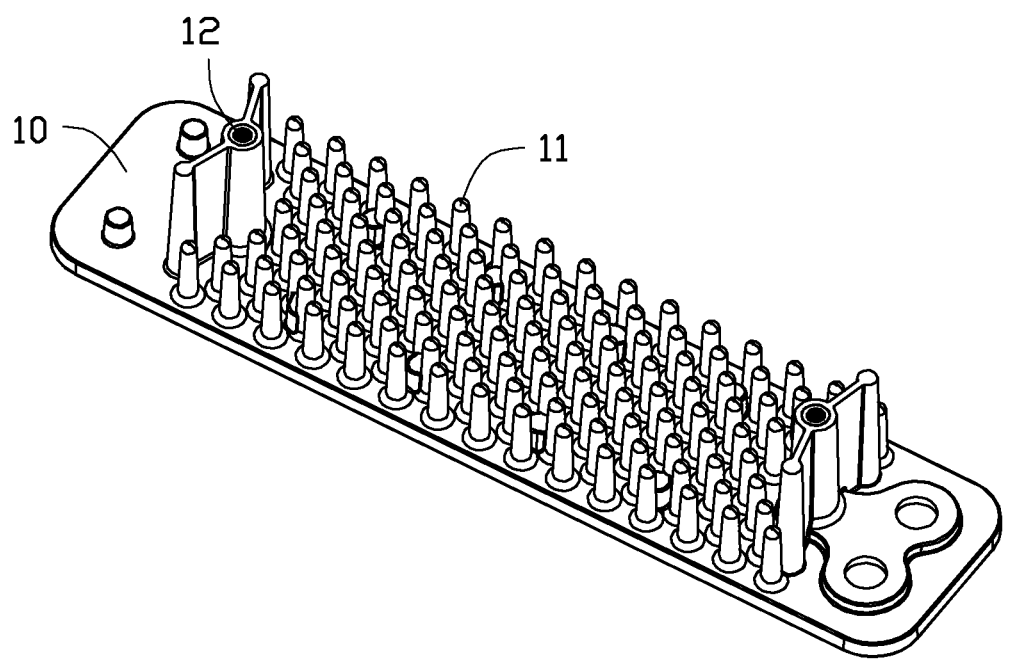
FIG. 3 is an isometric view of a bottom cover of the LED street light shown in FIG. 2.

FIG. 3 illustrates that the heat dissipation columns 11 can be positioned in an array, and can be cylindrical or spike shaped. The end of each heat dissipation column 11 away from the bottom cover 10 can have a smaller diameter than that of the other end. The heat dissipation columns 11 can be spaced from each other to enable air to pass through. The heat dissipation columns 11 can radiate heat generated in the LED street light 100. The bottom cover 10 can include at least one connecting member 12 on the surface away from the lamp board 20. The connecting member 12 can be configured to connect the LED street light 100 with a lamp holder (not shown). In at least one embodiment, there can be two connecting members 12. The connecting member 12 can be, but are not limited to, a screwed cap.

Figure 4:
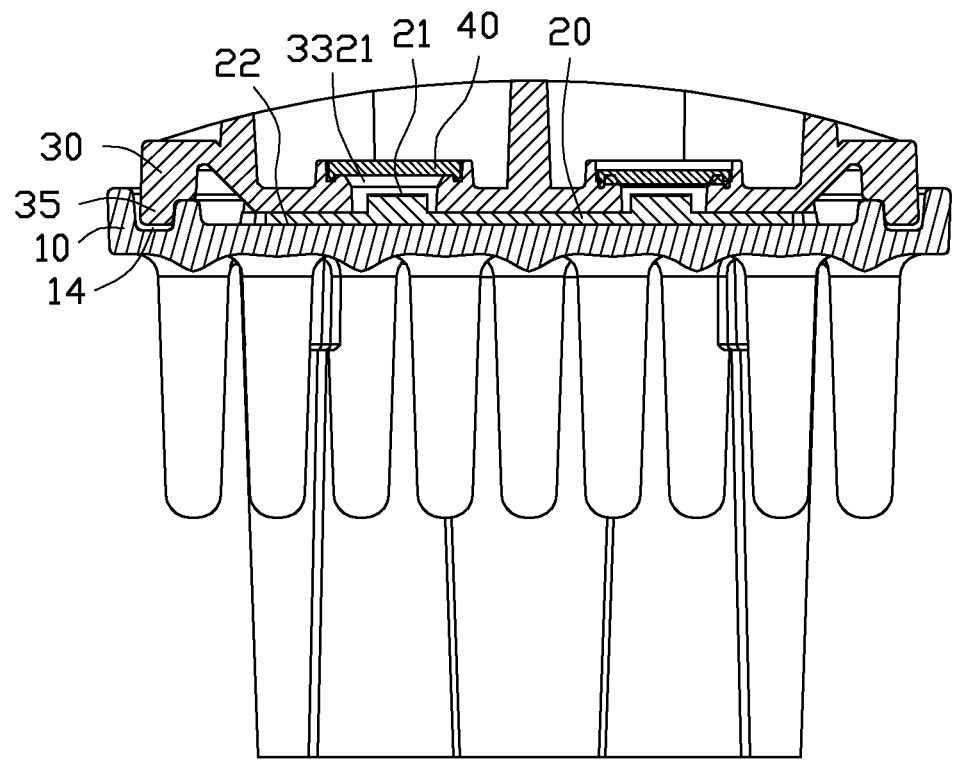
FIG. 4 is a cross-sectional view of FIG. 1 taken along line IV-IV.

FIG. 4 illustrates that the lamp board 20 can be smaller than the bottom cover 10, thereby the lamp board 20 can be received in the receiving space 50 between the bottom cover 10 and the top cover 30.

The lamp board 20 can include a thermally conductive adhesive 22 on the surface toward the bottom cover 10. When the lamp board 20 is coupled with the bottom cover 10, the thermally conductive adhesive 22 can transfer the heat from the LEDs 21 to the bottom cover 10. The top cover 30 can include a flange 35 on the surface toward the lamp board 20. The flange 35 can be latched in the ridge 14 of the bottom cover 10, and a sealing adhesive can be applied between the flange 35 and the ridge 14. In other embodiments, there can be a gasket arranged between the flange 35 and the ridge 14.

Figure 5:
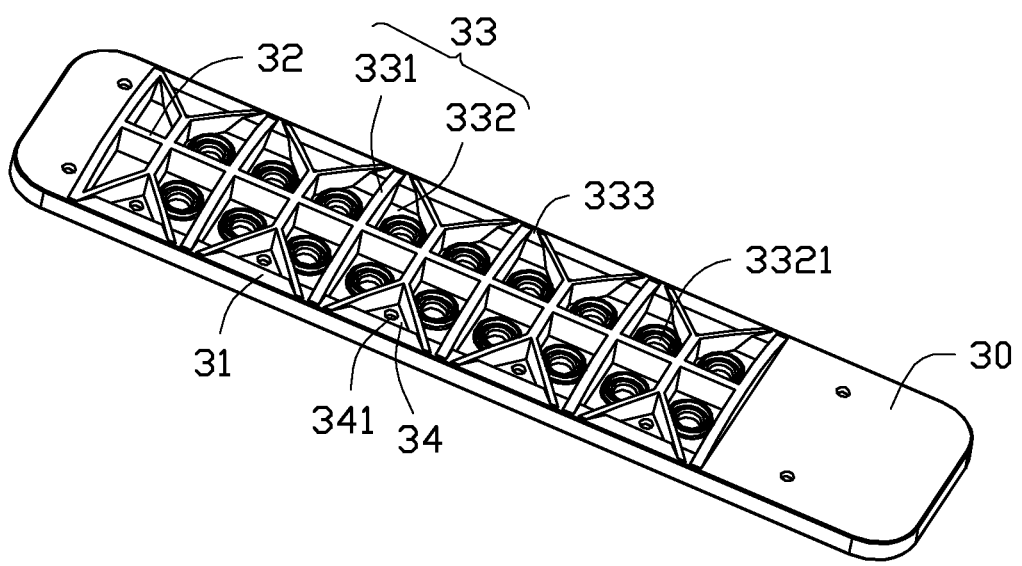
FIG. 5 is an isometric view of a top cover of the LED street light shown in FIG. 2.

FIG. 5 illustrates that the top cover 30 can be a rectangular plate On one surface away from the lamp board 20 there can be two parallel edges 31 and a separator plate 32. The separator plate 32 can be positioned between the two edges 31, and positioned parallel with the edges 31. The top cover 30 can include a plurality of recesses 33. The recesses 33 can be positioned at two sides of the separator plate 32. In at least one embodiment, the recesses 33 can be positioned in two rows parallel to the edges 31. Each recess 33 can be trapezoidal, wherein each recess 33 includes four side walls 331 and a bottom surface 332 positioned vertical to the side walls 331. One side wall 331 can be substantially perpendicular to the separator plate 32, and extend from the separator plate 32 to the edge 31. The height of the side wall 331 perpendicular to the separator plate 32 can decrease as the distance to the separator plate 32 increases. In at least one embodiment, there can be an opening 333 between two adjacent side walls 331, and the two adjacent side walls 331 disconnect with each other. That means that the recesses 33 can be left open and unenclosed. In other embodiments, the recesses 33 can be arranged in an array or other patterns. The recesses 33 can define more than one opening 333 between the side walls 331. The side walls 331 can increase area of heat dissipation and the openings 333 can diffuse heat within the recesses 33.

The bottom surface 332 of the recesses 33 can define a plurality of lamp holes 3321 corresponding to the LEDs 21 on the lamp board 20. The lamp holes 3321 can be circular, and the size of the lamp holes 3321 can be matched with the LED 21.

The lenses 40 can be disk shaped and made of transparent materials. Each lens 40 can cover a lamp hole 3321 of the top cover 30. The lenses 40 can be attached to the top cover 30 by a waterproof adhesive. The lenses 40 can be made of a polycarbonate which has high ductility and good optical properties.

The recesses 33 and the edge 31 cooperatively define a plurality of threaded grooves 34, and the threaded groove 34 can define a threaded hole 341 therein. The threaded holes 341 can be arranged to correspond to the cutouts 23 of the lamp board 20. The LED street light 100 can include a plurality of screws (not shown) for insertion in the threaded holes 341, the cutouts 23, and the blind holes 13. The bottom cover 10, the lamp board 20, and the top cover 30 can thereby be fixed together. In at least one embodiment, the threaded groove 34 can be triangular. In other embodiments, the threaded groove 34 can be rectangular or another shape.

A substantial portion of top cover 30 and the bottom cover 10 can be composed of thermally conductive material. In at least one embodiment, the top cover 30 and the bottom cover 10 can be made of a composite of polyamide and graphite. In other embodiments, the top cover 30 and the bottom cover 10 can be made of other plastic thermally conductive materials.

In assembly, the lamp board 20 can be positioned in the bottom cover 10, and pressed and held close to the bottom cover 10 by the thermally conductive adhesive 22. The cutouts 23 can be positioned to correspond to the blind holes 13. The top cover 30 can then be positioned above the lamp board 20, and the flange 35 can be latched in the ridge 14 of the bottom cover 10. Adhesive can be applied between the flange 35 and the ridge 14. Then, the bottom cover 10, the lamp board 20, and the top cover 30 can be coupled by screws. The lenses 40 can be arranged on the lamp holes 3321 of the top cover 30 and connected with the top cover 30 by an adhesive. The LED street light 100 can be assembled thus.

As the top cover 30 and the bottom cover 10 can be made of plastic thermally conductive materials, the top cover 30 and the bottom cover 10 can be used to dissipate heat, and the weight of the LED street light 100 can be lighter than a normal LED street light. The top cover 30 and the bottom cover 10 can be sealed with a waterproof adhesive to improve resistance to weathering. Moreover, as the bottom cover 10 can include a plurality of heat dissipation columns 11, the heat radiation efficiency of the LED street light 100 can be improved. The plurality of recesses 33 and side walls 331 on the top cover 30 can increase the area of heat dissipation.

The embodiments shown and described above are only examples. Many details are often found in the art such as the other features of a LED street light. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An light-emitting diode (LED) assembly, comprising:
a bottom cover;
a top cover, the bottom cover and the top cover forming a receiving space;
a lamp board positioned within the receiving space;
a plurality of lenses mounted on the top cover;
wherein, the lamp board is comprised of a plurality of LEDs;
wherein, a substantial portion of the top cover and bottom cover is composed of thermally conductive material;
wherein, the bottom cover includes a plurality of outwardly extending extensions aiding in heat dissipation;
wherein, the top cover includes a plurality of recesses formed by a plurality of recess side walls and a recess bottom surface;
wherein, a lamp hole extending through the top cover to is define in one or more of the plurality of recesses with one or more of the LEDs positioned in the lamp hole and one or more of the plurality of lenses is positioned over the LED; and
wherein, one or more of the recesses include one or more openings between adjacent side walls.

2. The LED street light of claim 1, wherein the extensions on the bottom cover are heat dissipating columns.

3. The LED street light of claim 1, wherein the extensions are spaced from each other; one end of the extension away from the bottom cover has a smaller diameter than that of the other end.

4. The LED street light of claim 1, wherein the bottom surface of each of the plurality of the recesses defines a lamp hole for transmitting light; the LED is placed in the lamp hole, and the lamp hole is covered by the lens.

5. The LED street light of claim 1, wherein a surface of the top cover away from the lamp board comprises two parallel edges and a separator plate positioned between the two edges; at least one side wall of the recess extends from the separator plate to the edge, and the height of the side wall decreases as the distance to the separator plate increases.

6. The LED street light of claim 5, wherein the recesses are trapezoid-shaped and comprises four side walls; the opening is placed between the two side walls adjacent to the edge of the lamp board.

7. The LED street light of claim 1, wherein the top cover further comprises a flange, and the bottom cover further comprises a ridge on a surface toward the lamp board; the flange is latched in the ridge.

8. The LED street light of claim 1, wherein the lamp board further comprises a thermally conductive adhesive on a surface toward the bottom cover; the lamp board and the bottom cover are fixed together by the thermally conductive adhesive.

9. The LED street light of claim 1, wherein the bottom cover further comprises a plurality of blind holes, and the top cover further comprises a plurality of threaded holes correspond to and mate with the blind holes.

10. The LED street light of claim 9, wherein the lamp board further comprises a plurality of cutouts correspond to and mate with the blind holes.

11. The LED street light of claim 1, wherein the top cover and the bottom cover are made of plastic thermally conductive materials.

12. The LED street light of claim 1, wherein the bottom cover and the top cover are made of a composite of polyamide and graphite.

13. The LED street light of claim 1, wherein the extensions are integrated with the bottom cover.

14. The LED street light of claim 1, wherein the extensions are column shaped.

15. The LED street light of claim 1, wherein the extensions are spike shaped.

* * * * *